Anderson & Vancleve,
Shearing Metal,
Nº 16,001
Patented Nov. 4, 1856.
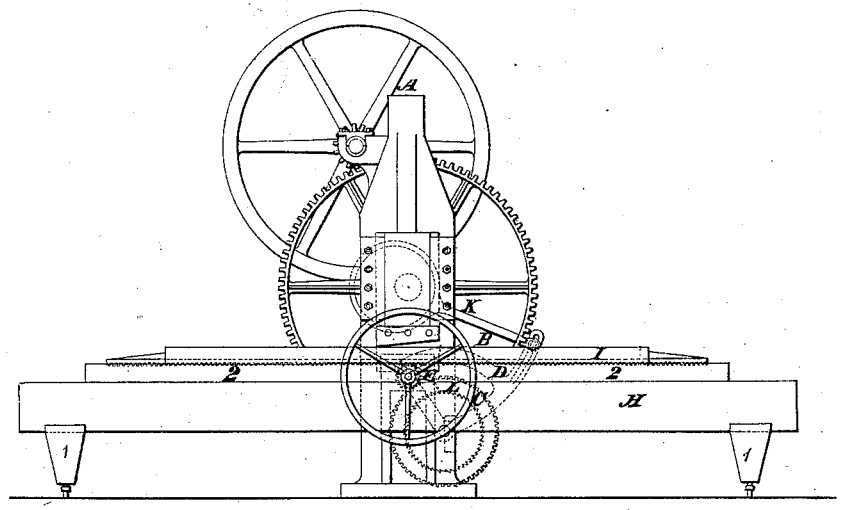
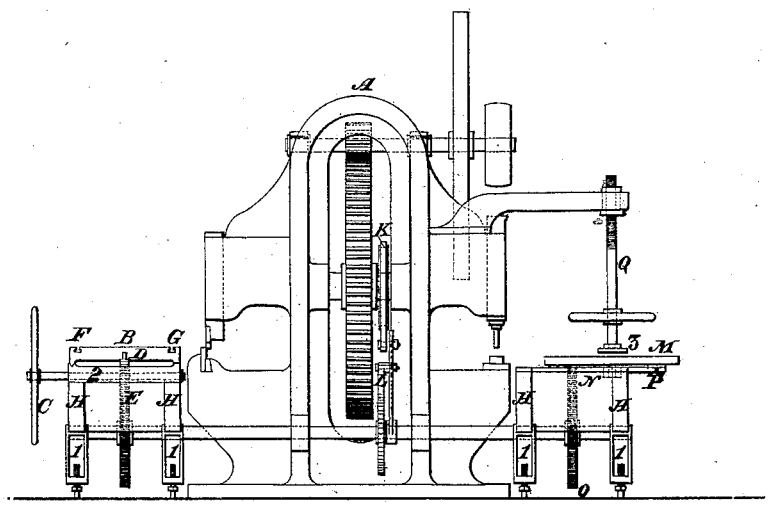
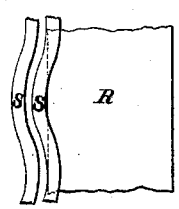
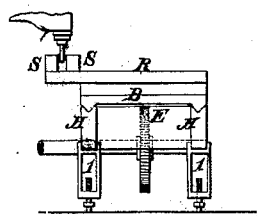

UNITED STATES PATENT OFFICE.

ROBERT ANDERSON AND AARON H. VANCLEVE, OF TRENTON, NEW JERSEY.

CUTTING METALS.

Specification of Letters Patent No. 16,001, dated November 4, 1856.

*To all whom it may concern:*

Be it known that we, ROBERT ANDERSON, of the United States Army, and AARON H. VANCLEVE, of Trenton, in the county of Mercer and State of New Jersey, have invented a new and Improved Mode of Cutting Iron and other Metallic Plates; and we do hereby declare that the following is a full and exact description, to wit:

The nature of our invention consists in combining a frame on which is erected a movable carriage with a shearing or punching machine of any known construction by which the plates can be moved in a parallel line with that of the edges of the shears and punch, and the plates thereby cut and punched perfectly straight, also in combining with a shearing and punching machine of any known construction, a traverse carriage, to which we attach pattern guides for the purpose of cutting or punching metallic plates in reverse or irregular curves, also in combining a revolving table with the traverse carriage and a shearing or punching machine of any known construction, by means of which plates may be cut in circles or segments of circles.

To enable others skilled in the art to make and use our invention, we will proceed to describe its construction and operation.

We construct our frame H on which the parallel and traverse carriages move of heavy timber or metal, the legs of which are set on graduating screws, for the purpose of adapting their height to plates of various thicknesses; on the top of this frame, we fit a set of cast iron slides or ways 2 2 2, on which the parallel carriage B moves.

The parallel carriage may be propelled by means of the hand wheel C, through the rack and pinion D E, or by means of the eccentrics K, and ratchet L and thus bring the plate to be cut, under the cutters or punch. We secure the plates to the parallel carriage B, with screw clamps fitted in the grooves G and F.

For the purpose of cutting or punching metallic plates in irregular curves, we place a traverse carriage R, on top of the parallel carriage B, and propel it in its crosswise motion, by means of the pattern guides S S, working against the cutter or punch. These pattern guides are to be made to conform to the various curves designed to be cut or punched; or this traverse carriage may be moved by hand, guided by the eye of the workmen to any curve previously laid on the plates, the plates are secured to the traverse carriage by screw clamps as above.

For the purpose of cutting plates into circles or segments of circles, we place a revolving table M, on the traverse carriage R, and give a rotary motion to it by the wheel O, a circular rack P, or other analogous movements propelled by the eccentric K, and the ratchet L, and thus cause the plate to revolve against the punch or cutters. We secure the plates to this table by means of the friction wheel 3, or center point, attached to the tightening screw 2. When accuracy is required in cutting curves or circles, we make our cutters to conform to a segment of the circle to be cut.

What we claim as our invention and desire to secure by Letters Patent, is—

The use of the parallel table B, revolving table M, and traversing table R, in connection with machinery for punching and shearing metals—when the said tables are constructed and operated in the manner herein described for cutting and punching straight, curved, or irregular forms in metal as set forth.

ROBERT ANDERSON.
A. H. VANCLEVE.

Witnesses:
BAILEY A. WEST,
JAMES N. VAN ANTWERP.